US009162891B2

(12) United States Patent
Hikata et al.

(10) Patent No.: US 9,162,891 B2
(45) Date of Patent: Oct. 20, 2015

(54) APPARATUS FOR MANUFACTURING CARBON NANOSTRUCTURE AND METHOD FOR MANUFACTURING CARBON NANOSTRUCTURE

(75) Inventors: Takeshi Hikata, Osaka (JP); Soichiro Okubo, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 312 days.

(21) Appl. No.: 13/702,710

(22) PCT Filed: Feb. 21, 2012

(86) PCT No.: PCT/JP2012/054071
§ 371 (c)(1),
(2), (4) Date: Dec. 7, 2012

(87) PCT Pub. No.: WO2012/153557
PCT Pub. Date: Nov. 15, 2012

(65) Prior Publication Data

US 2013/0078177 A1 Mar. 28, 2013

(30) Foreign Application Priority Data

May 9, 2011 (JP) ................................ 2011-104033

(51) Int. Cl.

| | |
|---|---|
| ***C01B 31/02*** | (2006.01) |
| ***B82Y 40/00*** | (2011.01) |
| ***B01J 19/08*** | (2006.01) |
| ***B01J 4/00*** | (2006.01) |
| ***B01J 37/34*** | (2006.01) |
| ***B01J 23/745*** | (2006.01) |
| ***B01J 35/00*** | (2006.01) |
| ***B82Y 30/00*** | (2011.01) |
| *B01J 35/06* | (2006.01) |

(52) U.S. Cl.
CPC ............ *C01B 31/0206* (2013.01); *B01J 4/001* (2013.01); *B01J 19/087* (2013.01); *B01J 23/745* (2013.01); *B01J 35/0033* (2013.01); *B01J 37/34* (2013.01); *B01J 37/348* (2013.01); *B82Y 30/00* (2013.01); *B82Y 40/00* (2013.01); *C01B 31/0233* (2013.01); *B01J 35/06* (2013.01); *B01J 2208/00415* (2013.01); *Y10S 977/891* (2013.01)

(56) References Cited

(58) Field of Classification Search
CPC C01B 31/02; C01B 31/0206; C01B 31/0233; B01J 37/34; B01J 37/348; B01J 23/745; B82Y 30/00; B82Y 40/00; Y10S 997/891
USPC ............ 423/447.1, 447.3; 977/742, 842, 843
See application file for complete search history.

(56) References Cited

U.S. PATENT DOCUMENTS

| | | | | |
|---|---|---|---|---|
| 7,749,460 B2 * | 7/2010 | Chang et al. | ................. | 422/186 |
| 2007/0172410 A1 | 7/2007 | Hikata | | |
| 2007/0224107 A1 | 9/2007 | Hikata | | |

FOREIGN PATENT DOCUMENTS

| | | |
|---|---|---|
| CN | 1946635 A | 4/2007 |
| CN | 1964918 A | 5/2007 |

(Continued)

OTHER PUBLICATIONS

Wei, Dacheng, et al. "A magnetism-assisted chemical vapor deposition method to produce branched or iron-encapsulated carbon nanotubes." Journal of the American Chemical Society 129.23 (2007): 7364-7368.*

H. Yokomichi et al., "Synthesis of Carbon Nanotubes by Thermal CVD under High Magnetic Field", Transactions of the Materials Research Society of Japan, vol. 28, No. 2, Jun. 2003, pp. 291-293.

Takeshi Hikata, "Study of New Manufacturing Process for Longer length Carbon Nanotubes", SEI Technical Review, No. 173, Jul. 2008, pp. 30-34, including partial English translation.

*Primary Examiner* — Richard M Rump

(74) *Attorney, Agent, or Firm* — Drinker Biddle & Reath LLP

(57) ABSTRACT

An apparatus for manufacturing a carbon nanostructure and a method for manufacturing a carbon nanostructure that can achieve an increase in length and shape stabilization of the carbon nanostructure can be obtained. A manufacturing apparatus for a carbon nanostructure includes a catalyst member on which a carbon nanostructure is grown, a source gas supply unit and a source gas supply pipe, a coil, and a heater. The source gas supply unit and the source gas supply pipe supply the catalyst member with carbon for forming the carbon nanotube. The coil applies a gradient magnetic field (e.g., a cusped magnetic field indicated by magnetic flux line whose magnetic field strength gradually increases from one surface of the catalyst member to the other surface opposite to the one surface. The heater heats the catalyst member.

5 Claims, 3 Drawing Sheets

FOREIGN PATENT DOCUMENTS

| | | | |
|---|---|---|---|
| JP | 2000-86216 | | 3/2000 |
| JP | 2001-098430 | A | 4/2001 |
| JP | 2005-288636 | | 10/2005 |
| JP | 2005-330175 | | 12/2005 |
| JP | 2007-181766 | | 7/2007 |
| JP | 2011-60944 | | 3/2011 |

* cited by examiner

APPARATUS FOR MANUFACTURING CARBON NANOSTRUCTURE AND METHOD FOR MANUFACTURING CARBON NANOSTRUCTURE

TECHNICAL FIELD

The present invention relates to an apparatus for manufacturing a carbon nanostructure and a method for manufacturing a carbon nanostructure, and more particularly relates to an apparatus for manufacturing a carbon nanostructure and a method for manufacturing a carbon nanostructure through the use of a catalyst member.

BACKGROUND ART

Conventionally, a carbon nanostructure, such as a carbon nanotube, is expected to be an excellent next-generation conductive material for use in electric power transmission and communications. As methods for manufacturing the carbon nanostructure, various methods including a catalyst CVD method through the use of a metal nanoparticle catalyst and a carbon transmission method have been proposed (see e.g., Takeshi HIKATA, "Study of New Manufacturing Process for Longer length Carbon Nanotubes", SEI Technical Review, No. 173, pp. 30-34, July 2008, (NPL 1)).

CITATION LIST

Non Patent Literature

NPL 1: Takeshi HIKATA, "Study of New Manufacturing Process for Longer length Carbon Nanotubes", SEI Technical Review, No. 173, pp. 30-34, July 2008

SUMMARY OF INVENTION

Technical Problem

The inventors have been studying about the method for manufacturing a carbon nanotube by the carbon transmission method disclosed in NPL 1 mentioned above, and have succeeded in manufacturing a carbon nanotube having a length of approximately 100 μm to 200 μm by the carbon transmission method. However, it is conventionally difficult to manufacture a carbon nanotube even longer than 200 μm. Further, it is difficult to stably keep an obtained carbon nanotube in a uniform shape (e.g., a shape extending in one direction without being curved).

On the other hand, considering practical use, a further increase in length and shape stabilization are being required of the carbon nanostructure such as a carbon nanotube.

The present invention was made to solve such problems, and an object of the present invention is to provide an apparatus for manufacturing a carbon nanostructure and a method for manufacturing a carbon nanostructure that can achieve an increase in length and shape stabilization of the carbon nanostructure.

Solution to Problem

The inventors derived a new idea of utilizing a gradient magnetic field in order to promote diffusion of carbon in a catalyst member used for manufacturing a carbon nanostructure from knowledge that the diffusion coefficient of carbon in iron increases in a gradient magnetic field, and completed the present invention. That is, an apparatus for manufacturing a carbon nanostructure according to the present invention includes a catalyst member on which a carbon nanostructure is grown, a raw material supply unit, a magnetic field producing member, and a heating member. The raw material supply unit supplies the catalyst member with carbon for forming the carbon nanostructure. The magnetic field producing member applies a gradient magnetic field whose magnetic field strength gradually increases from one surface of the catalyst member to the other surface opposite to the one surface. The heating member heats the catalyst member.

Then, the catalyst member can be heated with carbon being supplied to the one surface of the catalyst member while applying a gradient magnetic field to the catalyst member. In this case, diffusion of carbon in the catalyst member from the one surface side of the catalyst member to the other surface side is promoted by the gradient magnetic field. Therefore, since the carbon supplied to the one surface of the catalyst member is diffused gradually to the other surface side, the carbon concentration can be prevented from being saturated in the one surface. Accordingly, it is possible to prevent stop of capturing of carbon in the one surface which would be caused by the carbon concentration being saturated in the one surface. Since carbon is therefore continuously supplied to the other surface side of the catalyst member, a carbon nanostructure can be continuously grown on the other surface. As a result, an increase in length of the carbon nanostructure can be achieved.

Moreover, by the application of gradient magnetic field, the shape of the other surface of the catalyst member receives stress caused by the magnetic field. With that stress, the catalyst member is stabilized in surface shape when the carbon nanostructure is grown. As a result, the growing carbon nanostructure can be prevented from becoming unstable in shape (e.g., being changed irregularly) by the catalyst varying in surface shape.

A method for manufacturing a carbon nanostructure according to the present invention includes the steps of preparing a catalyst member on which a carbon nanostructure is grown, and growing the carbon nanostructure on the catalyst member by supplying carbon to the catalyst member while heating the catalyst member. In the step of growing the carbon nanostructure, a gradient magnetic field whose magnetic field strength gradually increases from one surface of the catalyst member to the other surface opposite to the one surface is applied. The above-described method for manufacturing a carbon nanostructure may be carried out using the above-described apparatus for manufacturing a carbon nanostructure.

Then, diffusion of carbon in the catalyst member from the one surface side to the other surface side of the catalyst member is promoted by the gradient magnetic field. Therefore, since the carbon supplied to the one surface of the catalyst member is diffused gradually to the other surface side, the carbon concentration can be prevented from being saturated in the one surface. Accordingly, it is possible to prevent stop of capturing of carbon in the one surface which would be caused by the carbon concentration being saturated in the one surface. Since carbon is therefore continuously supplied to the other surface side of the catalyst member, a carbon nanostructure can be continuously grown on the other surface. As a result, an increase in length of the carbon nanostructure can be achieved.

Moreover, by the application of gradient magnetic field, the shape of the other surface of the catalyst member receives stress caused by the magnetic field. With that stress, the catalyst member is stabilized in surface shape when the carbon nanostructure is grown. As a result, the growing carbon nanostructure can be prevented from becoming unstable in shape by the catalyst varying in surface shape.

Advantageous Effects of Invention

According to the present invention, an increase in length and shape stabilization of a carbon nanostructure can be achieved.

DESCRIPTION OF EMBODIMENTS

Figure 1:
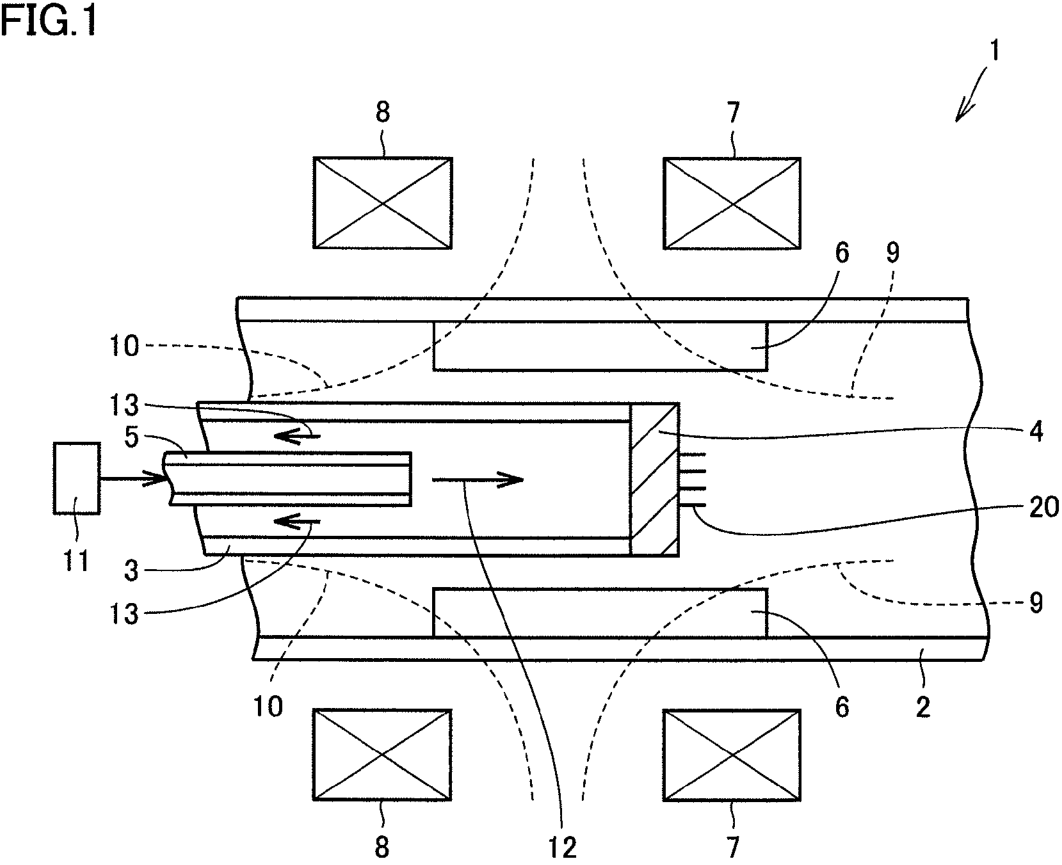
FIG. 1 is a schematic view showing a first embodiment of an apparatus for manufacturing a carbon nanostructure according to the present invention.

Hereafter, embodiments of the present invention will be described based on the drawings. It is noted that, in the drawings, the same or corresponding portions have the same reference characters allotted, and detailed description thereof will not be repeated.

First Embodiment

Figure 2:
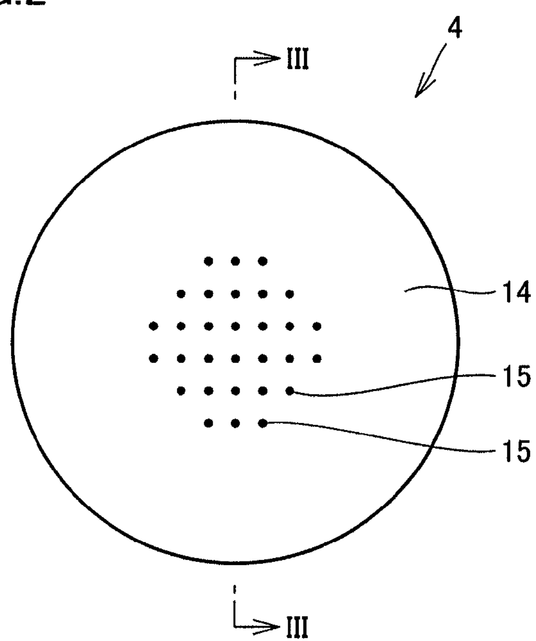
FIG. 2 is a schematic plan view of a catalyst member for use in a manufacturing apparatus 1 shown in FIG. 1.
Figure 3:
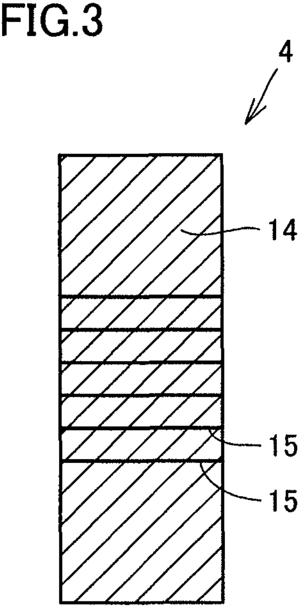
FIG. 3 is a schematic cross-sectional view taken along line segment in FIG. 2.

Referring to FIGS. 1 to 3, an apparatus for manufacturing a carbon nanostructure according to the present invention will be described. It is noted that the carbon nanostructure in the present specification means a fine structure mainly composed of carbon atoms, such as a carbon nanotube and a graphite tape, for example.

The manufacturing apparatus shown in FIG. 1 includes a processing container 2, a catalyst member 4, a heater 6 for heating catalyst member 4, and coils 7 and 8 for applying a gradient magnetic field to catalyst member 4. Sectional shape of processing container 2 in the direction perpendicular to FIG. 1 can have any shape, such as circular or rectangular. Catalyst member 4 is arranged inside processing container 2. A source gas recovery chamber 3 is arranged to be connected to one surface of this catalyst member 4. From a different viewpoint, a part of a wall surface of source gas recovery chamber 3 is formed by at least a part of one surface of catalyst member 4. Then, a source gas supply pipe 5 is arranged at a position facing the one surface of catalyst member 4. Source gas supply pipe 5 has its one end arranged inside source gas recovery chamber 3, and its other end connected to a source gas supply unit 11.

Source gas supply unit 11 supplies the one surface of catalyst member 4 with a source gas containing carbon to be a raw material of a carbon nanotube via source gas supply pipe 5. That is, the source gas supplied from source gas supply unit 11 is sprayed onto the one surface of catalyst member 4 via source gas supply pipe 5, as indicated by an arrow 12. In catalyst member 4, the carbon supplied from the source gas is captured into the inner side through the one surface, and then the carbon diffuses within the catalyst to the other surface side (the surface opposite to the one surface facing source gas recovery chamber 3). Then, a carbon nanotube 20 is grown on the other surface of catalyst member 4. It is noted that the source gas sprayed onto the one surface of catalyst member 4 as described above then circulates in source gas recovery chamber 3 and is recovered, as indicated by an arrow 13. It is noted that, as the source gas containing carbon, it is preferable to use, for example, a hydrocarbon-based gas such as methane or ethylene, an alcohol-based gas such as ethanol or methanol, or a carbon monoxide gas or the like. Furthermore, the above-described source gas preferably also contains an oxidized gas such as carbon dioxide ($CO_2$) or water ($H_2O$). It is more desirable to add the above-described oxidized gas to the source gas since the effect that the carbon concentration is less likely to be saturated in the one surface of catalyst member 4 is obtained.

Heater 6 for heating catalyst member 4 is arranged in processing container 2. Heater 6 is arranged, for example, on the inner circumferential surface of the wall of processing container 2. It is noted that heater 6 may be arranged outside processing container 2. Although any heating mechanism can be used as heater 6, and an electrothermal heater or the like may be used, for example.

Coils 7 and 8 for forming a cusped magnetic field as indicated by magnetic flux lines 9 and 10 are arranged outside processing container 2. Coils 7 and 8 each have an annular shape surrounding the outer circumference of processing container 2. Assuming that an axis extending from the one surface to the other surface of catalyst member 4 is a central axis, coils 7 and 8 are aligned in the direction along the central axis and arranged around the central axis.

By flowing electric current through such coils 7 and 8, a so-called cusped magnetic field as indicated by magnetic flux lines 9 and 10 is created. By this cusped magnetic field, catalyst member 4 is subject to changes in strength of magnetic field in its thickness direction (specifically, the magnetic field gradually increases in strength from the one surface side facing source gas supply pipe 5 to the other surface side on which carbon nanotube 20 is grown). By the application of such a cusped magnetic field (magnetic field whose strength changes in the thickness direction of catalyst member 4), diffusion of carbon from the one surface side to the other surface side of catalyst member 4 is promoted. As a result, it is possible to prevent the carbon concentration from reaching a saturated concentration in the one surface of catalyst member 4, so that carbon can be continuously captured into catalyst member 4. Accordingly, carbon nanotube 20 can be grown continuously. It is noted that any magnetic field producing member other than the structure using coils 7 and 8 as described above can be used if the gradient magnetic field as described above can be applied to catalyst member 4. For example, a method may be used which creates a gradient magnetic field by arranging only a single coil to surround catalyst member 4 or arranging a plurality of coils having different capabilities around catalyst member 4. As for the arrangement of the above-described coils and the like, an arrangement that maximizes the magnetic field gradient strength is preferable.

A structure of catalyst member 4 will now be described with reference to FIGS. 2 and 3.

As shown in FIGS. 2 and 3, catalyst member 4 is configured such that its planar shape is circular and a plurality of iron filaments 15 are arranged in a base member 14 made of silver to extend through from the one surface side to the other surface side. Preferably, a carbon nanotube will be formed if the shape of iron filament 15 is cylindrical, and a carbon nanotube or a graphite sheet will be formed if iron filament 15 has the shape of tape. Carbon to constitute the above-described carbon nanotube diffuses in iron filament 15. Then, on the other surface side of catalyst member 4 shown in FIG. 1, carbon nanotube 20 is grown from the surface (end surface) of this iron filament 15. It is noted that a method for manufacturing catalyst member 4 shown in FIGS. 2 and 3 will be described later.

A modification of the catalyst member for use in the apparatus for manufacturing a carbon nanotube according to the present invention will be described with reference to FIGS. 4 and 5.

Figure 4:
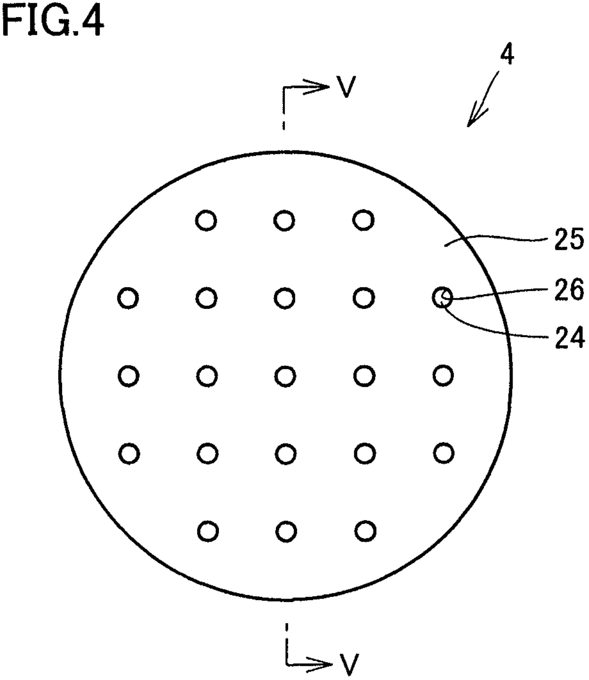
FIG. 4 is a schematic plan view showing a modification of the catalyst member.
Figure 5:
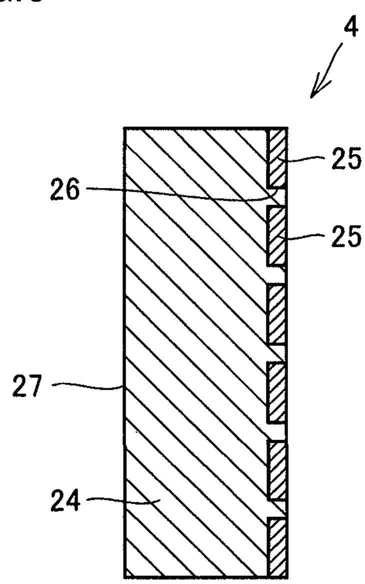
FIG. 5 is a schematic cross-sectional view taken along line segment V-V in FIG. 4.

Catalyst member 4 shown in FIGS. 4 and 5 has an alumina film 25 having a plurality of openings 26 formed on the surface of a base film 24 made of iron. Openings 26 in alumina film 25 are distributed in the surface of catalyst member 4, as shown in FIG. 4. A portion of base film 24 is exposed by opening 26. In the case of using such catalyst member 4 as catalyst member 4 for manufacturing apparatus 1 shown in FIG. 1, the one surface 27 side of base film 24 in which alumina film 25 is not formed is arranged at a position facing source gas supply pipe 5 of FIG. 1.

Any method can be adopted as the method for manufacturing catalyst member 4 shown in FIGS. 4 and 5. For example, catalyst member 4 may be formed using a method for simultaneously depositing alumina and iron (e.g., RF magnetron sputtering method). Alternatively, base film 24 made of iron is manufactured by any method, and then alumina film 25 having openings 26 is formed by sputtering or the like on the surface of base film 24. Openings 26 may be formed using a method such as previously forming a resist pattern on a region where openings 26 should be formed on base film 24 using photolithography method or the like, thereafter forming alumina film 25, and then removing a portion of alumina film 25 having been formed on the resist pattern together with the resist pattern.

Even when catalyst member 4 of such a structure is used, carbon diffuses in base film 24 made of iron from the one surface 27 side to the alumina film 25 side. Then, carbon nanotube 20 (see FIG. 1) is grown from the surface of base film 24 exposed by openings 26 formed in alumina film 25. Moreover, in manufacturing apparatus 1 shown in FIG. 1, diffusion of carbon in base film 24 from the one surface 27 side to the alumina film 25 side is promoted by the gradient magnetic field produced by coils 7 and 8. Accordingly, a problem in that, for example, the carbon concentration is saturated in one surface 27 of base film 24 made of iron to reduce the rate of capturing carbon atoms into base film 24 can be prevented from occurring. Therefore, carbon nanotube 20 can be grown continuously, and as a result, carbon nanotube 20 longer than conventional can be obtained. It is noted that the structure of catalyst member 4 shown in FIGS. 2 to 4 is an example, and a catalyst member of any structure that can diffuse carbon from the one surface side to the other surface side at the growth temperature of a carbon nanotube can be utilized.

A method for manufacturing a carbon nanostructure using manufacturing apparatus 1 for a carbon nanostructure shown in FIG. 1 (a method for manufacturing carbon nanotube 20) will now be described with reference to FIG. 6.

Figure 6:
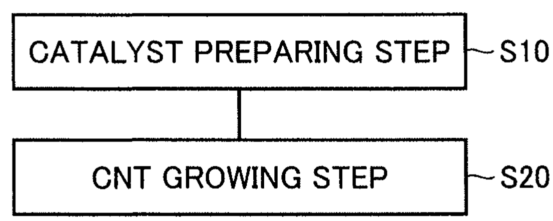
FIG. 6 is a flowchart for illustrating a method for manufacturing a carbon nanotube using the manufacturing apparatus shown in FIG. 1.

As shown in FIG. 6, first, a catalyst preparing step (S10) is carried out. Specifically, catalyst member 4 shown in FIGS. 2 and 3, for example, is prepared. This catalyst member 4 can be manufactured by any method, and can be manufactured by the following method (so-called wire drawing method), for example.

That is, first, a wire rod of high-purity iron (e.g., a wire rod made of high-purity iron in which the ratio of iron is 99.998% by mass) is inserted into a pipe made of silver, and the pipe is subjected to wire drawing together with the wire rod of high-purity iron. Then, the wire rod obtained by wire drawing is cut to a predetermined length. Then, a plurality of wire rods are gathered, and another pipe made of silver is filled with these plurality of wire rods. Then, the pipe is subjected to wire drawing again.

Such a process step (drawing step—cutting step—inserting step) is repeated several times to obtain a member formed of base member 14 made of silver and plurality of iron filaments 15 extending through the inside of base member 14 (e.g., a cylindrical member having a diameter of 10 mm) is obtained as shown in FIGS. 2 and 3. Then, by slicing this member in the direction perpendicular to the direction in which iron filaments 15 extend, catalyst member 4 as shown in FIGS. 2 and 3 can be obtained. It is noted that catalyst member 4 can have a thickness of approximately 50 μm, for example. Then, catalyst member 4 thus obtained is arranged inside manufacturing apparatus 1 shown in FIG. 1.

Next, as shown in FIG. 6, a carbon nanotube (CNT) growing step (S20) is carried out. Specifically, the source gas for carbon nanotube containing carbon atoms is supplied to the one surface of catalyst member 4 from source gas supply unit 11 via source gas supply pipe 5. At this time, previously, catalyst member 4 is heated to a predetermined temperature by heater 6, and electric current is applied to coils 7 and 8, thereby creating a magnetic field (a cusped magnetic field) as indicated by magnetic flux lines 9 and 10. The source gas containing carbon is supplied to the one surface of catalyst member 4 with the gradient magnetic field being applied to catalyst member 4 and with catalyst member 4 being heated. As a result, carbon is diffused in the thickness direction of catalyst member 4 (the direction from the one surface to the other surface), and carbon nanotube 20 is grown on the other surface of catalyst member 4. Since diffusion of carbon in catalyst member 4 is promoted by the gradient magnetic field, a problem in that, for example, the carbon concentration is saturated in the one surface of catalyst member 4 to suppress capturing of carbon atoms can be prevented from occurring.

Since the shape of ends of iron filaments 15 located on the other surface side of catalyst member 4 is stabilized by the cusped magnetic field, formed carbon nanotube 20 is prevented from being changed in shape, such as being curved greatly. As a result, relatively less curved carbon nanotube 20 is obtained.

Although there are some repetitions of the embodiment described above, characteristic structures of the present invention will be enumerated below.

Manufacturing apparatus 1 for a carbon nanostructure according to the present invention includes catalyst member 4 on which carbon nanotube 20 as a carbon nanostructure is grown, a raw material supply unit (source gas supply unit 11, source gas supply pipe 5), a magnetic field producing member (coils 7, 8), and a heating member (heater 6). The raw material supply unit (source gas supply unit 11, source gas supply pipe 5) supplies catalyst member 4 with carbon for forming carbon nanotube 20. The magnetic field producing member (coils 7, 8) applies a gradient magnetic field (e.g., a cusped magnetic field indicated by magnetic flux lines 9, 10) whose magnetic field strength gradually increases from the one surface of catalyst member 4 (one end surfaces of iron filaments 15 of FIG. 3 or one surface 27 of FIG. 5) to the other surface facing the one surface (the other end surfaces of iron filaments 15 of FIG. 3 or a part of the surface of base film 24 made of iron exposed by openings 26 of alumina film 25 opposite to one surface 27 of FIG. 5). The heating member (heater 6) heats catalyst member 4.

Then, catalyst member 4 can be heated with carbon being supplied to the one surface of catalyst member 4 (one end surfaces of iron filaments 15 of FIG. 3 or one surface 27 of FIG. 5) while applying a gradient magnetic field to catalyst member 4. In this case, diffusion of carbon in catalyst member 4 from the one surface side of catalyst member 4 (one end surfaces of iron filaments 15 of FIG. 3 or one surface 27 of FIG. 5) to the other surface side is promoted by the gradient magnetic field. Therefore, since the carbon supplied to the one surface of catalyst member 4 (one end surfaces of iron filaments 15 of FIG. 3 or one surface 27 of FIG. 5) is diffused gradually to the other surface side, the carbon concentration can be prevented from being saturated in the one surface (one end surfaces of iron filaments 15 of FIG. 3 or one surface 27 of FIG. 5). Accordingly, it is possible to prevent stop of capturing of carbon in the one surface which would be caused by the carbon concentration being saturated in the one surface (one end surfaces of iron filaments 15 of FIG. 3 or one surface 27 of FIG. 5). Since carbon is therefore continuously supplied to the other surface side of catalyst member 4, carbon nanotube 20 can be continuously grown on the other surface. As a result, an increase in length of carbon nanotube 20 can be achieved.

Moreover, by the application of gradient magnetic field, the shape of the other surface of catalyst member 4 receives stress caused by the magnetic field. With that stress, the surface shape of catalyst member 4 is stabilized when carbon nanotube 20 is grown. As a result, growing carbon nanotube 20 can be prevented from becoming unstable in shape (e.g., being changed irregularly) by catalyst member 4 varying in surface shape. Carbon nanotube 20 extending relatively straight can thus be obtained.

Above-described manufacturing apparatus 1 for a carbon nanostructure may further include a raw material chamber (source gas recovery chamber 3) connected to at least a part of one surface 27 of catalyst member 4 and having an inner wall portion formed by at least a part of one surface 27 of catalyst member 4. The raw material supply unit (source gas supply unit 11, source gas supply pipe 5) may supply the source gas containing carbon to source gas recovery chamber 3.

In this case, since one surface 27 of catalyst member 4 is exposed to the inner side of source gas recovery chamber 3, the source gas supplied via source gas supply pipe 5 can be selectively brought into contact with one surface 27. Carbon in the source gas can thereby be captured into the inner side of catalyst member 4 through one surface 27. That is, since a portion of catalyst member 4 (the other surface) where carbon nanotube 20 is grown and a portion (one surface 27) to which carbon as a raw material is supplied can be separated, a problem in that, for example, the growth of carbon nanotube 20 is inhibited by the influence of source gas can be prevented from occurring.

Moreover, by the application of gradient magnetic field, diffusion of carbon from the one surface 27 side to the other surface side is promoted in catalyst member 4. Therefore, by selectively supplying carbon to one surface 27, the effect of promoting carbon diffusion by the gradient magnetic field can be fully utilized.

In above-described manufacturing apparatus 1 for a carbon nanostructure, assuming that an axis extending from one surface 27 to the other surface of catalyst member 4 is a central axis, the magnetic field producing member (coils 7, 8) may include two coils 7, 8 aligned in the direction along the central axis and arranged around the central axis.

In this case, the magnetic field formed by two coils 7, 8 is a so-called cusped magnetic field, and the magnetic field strength can be increased in gradient. Accordingly, the gradient of magnetic field in catalyst member 4 can be increased effectively, as a result of which can further promote diffusion of carbon in catalyst member 4.

A method for manufacturing a carbon nanostructure according to the present invention includes a step of preparing catalyst member 4 on which a carbon nanostructure is grown (catalyst preparing step (S10)) and a step of growing the carbon nanostructure (carbon nanotube 20) on catalyst member 4 by supplying carbon to catalyst member 4 while heating catalyst member 4 (CNT growing step (S20)). In the CNT growing step (S20), a gradient magnetic field whose magnetic field strength gradually increases from one surface 27 of catalyst member 4 to the other surface opposite to one surface 27 is applied. The above-described method for manufacturing a carbon nanostructure may be carried out using above-described manufacturing apparatus 1 for a carbon nanostructure.

Then, diffusion of carbon in catalyst member 4 from the one surface 27 side of catalyst member 4 to the other surface side is promoted by the gradient magnetic field. Therefore, since the carbon supplied to one surface 27 of catalyst member 4 is diffused gradually to the other surface side, the carbon concentration can be prevented from being saturated in the one surface (one end surfaces of iron filaments 15 of FIG. 3 or one surface 27 of FIG. 5). Accordingly, it is possible to prevent stop of capturing of carbon in the one surface which would be caused by the carbon concentration being saturated in the one surface. Since carbon is therefore continuously supplied to the other surface side of catalyst member 4, carbon nanotube 20 can be continuously grown on the other surface. As a result, an increase in length of carbon nanotube 20 can be achieved.

Moreover, by the application of gradient magnetic field, the shape of the other surface of catalyst member 4 receives stress caused by the magnetic field. With that stress, the surface shape of catalyst member 4 is stabilized when carbon nanotube 20 is grown. As a result, growing carbon nanotube 20 can be prevented from becoming unstable in shape by catalyst member 4 varying in surface shape.

In the above-described method for manufacturing a carbon nanostructure, in the step of growing a carbon nanostructure (CNT growing step (S20)), carbon may be supplied to the one surface of catalyst member 4, and carbon nanotube 20 may be grown on the other surface of catalyst member 4.

In this case, a portion of catalyst member 4 (the other surface) where carbon nanotube 20 is grown and a portion (one surface 27) to which carbon as a raw material is supplied can be separated. Therefore, a problem in that, for example, the growth of carbon nanotube 20 is inhibited by the influence of source gas can be prevented from occurring.

In the above-described method for manufacturing a carbon nanostructure, in the step of growing a carbon nanostructure (CNT growing step (S20)), assuming that an axis extending from the one surface to the other surface of catalyst member 4 is a central axis, the gradient magnetic field may be formed by the cusped magnetic field produced by two coils 7, 8 aligned in the direction along the central axis and arranged around the central axis.

In this case, as to the gradient magnetic field applied to catalyst member 4, the magnetic field strength can further be increased in gradient by the cusped magnetic field. Accordingly, diffusion of carbon in catalyst member 4 can be promoted further. As a result, the growth rate of carbon nanotube 20 can be improved.

It should be understood that the embodiment disclosed herein is illustrative and non-restrictive in every respect. The scope of the present invention is defined by the claims not by the description above, and is intended to include any modification within the meaning and scope equivalent to the terms of the claims.

INDUSTRIAL APPLICABILITY

The present invention is applied particularly advantageously to manufacture of a long carbon nanostructure, such as a carbon nanotube or a graphite tape.

REFERENCE SIGNS LIST

1 manufacturing apparatus; 2 processing container; 3 source gas recovery chamber; 4 catalyst member; 5 source gas supply pipe; 6 heater; 7, 8 coil; 9, 10 magnetic flux line; 11 source gas supply unit; 12, 13 arrow; 14 base member (Ag); 15 iron filament; 20 carbon nanotube; 24 iron base film; 25 alumina film; 26 opening; 27 one surface.

The invention claimed is:

1. An apparatus for manufacturing a carbon nanostructure, comprising:

a catalyst member on which a carbon nanostructure is grown;

a raw material supply unit for supplying one surface of said catalyst member with carbon along a direction intersecting with the one surface of said catalyst member for forming said carbon nanostructure;

a magnetic field producing member for applying a gradient magnetic field whose magnetic field strength gradually increases from one surface of said catalyst member to the other surface opposite to said one surface; and a heating member for heating said catalyst member.

2. The apparatus for manufacturing a carbon nanostructure according to claim 1, further comprising a raw material chamber connected to at least a part of said one surface of said catalyst member and having an inner wall portion formed by at least a part of said one surface of said catalyst member, wherein said raw material supply unit supplies said raw material chamber with a source gas containing said carbon.

3. The apparatus for manufacturing a carbon nanostructure according to claim 1, wherein, assuming that an axis extending from said one surface to said other surface of said catalyst member is a central axis, said magnetic field producing member includes two coils aligned in a direction along said central axis and arranged around said central axis.

4. A method for manufacturing a carbon nanostructure, comprising the steps of:

preparing a catalyst member on which a carbon nanostructure is grown; and growing said carbon nanostructure on said catalyst member by supplying carbon to one surface of said catalyst member along a direction intersecting with the one surface of said catalyst member while heating said catalyst member, wherein in the step of growing said carbon nanostructure, a gradient magnetic field whose magnetic field strength gradually increases from one surface of said catalyst member to the other surface opposite to said one surface is applied, wherein in the step of growing said carbon nanostructure, assuming that an axis extending from said one surface to said other surface of said catalyst member is a central axis, said gradient magnetic field is formed by a cusped magnetic field produced by two coils aligned in a direction along said central axis and arranged around said central axis.

5. The method for manufacturing a carbon nanostructure according to claim 4, wherein in the step of growing said carbon nanostructure, said carbon is supplied to said one surface of said catalyst member, and said carbon nanostructure is grown on said other surface of said catalyst member.

* * * * *